US012783155B2

(12) United States Patent
Li et al.

(10) Patent No.: US 12,783,155 B2
(45) Date of Patent: Nov. 3, 2026

(54) SYSTEMS AND METHODS FOR CONVERTING ADDRESS INFORMATION FOR DATA MANAGEMENT IN STORAGE DEVICES

(71) Applicant: Samsung Electronics Co., Ltd., Suwon-si (KR)

(72) Inventors: Zongwang Li, Dublin, CA (US); Tong Zhang, Mountain View, CA (US); Rekha Pitchumani, Oak Hill, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/468,601

(22) Filed: Sep. 15, 2023

(65) Prior Publication Data

US 2024/0411477 A1 Dec. 12, 2024

Related U.S. Application Data

(60) Provisional application No. 63/471,413, filed on Jun. 6, 2023.

(51) Int. Cl.
*G06F 3/06* (2006.01)

(52) U.S. Cl.
CPC .......... *G06F 3/0655* (2013.01); *G06F 3/0604* (2013.01); *G06F 3/0629* (2013.01); *G06F 3/0679* (2013.01)

(58) Field of Classification Search
CPC .... G06F 3/0655; G06F 3/0604; G06F 3/0629; G06F 3/0679; G06F 3/0616; G06F 3/0652; G06F 3/0688; G06F 13/1668; G06F 13/4295; G06F 2212/1016; G06F 3/064; G06F 2212/7201; G06F 2212/7208; G06F 12/0246; G06F 3/0661
See application file for complete search history.

(56) References Cited

U.S. PATENT DOCUMENTS

| | | | |
|---|---|---|---|
| 10,282,094 | B2 | 5/2019 | Kachare et al. |
| 11,334,274 | B2 | 5/2022 | Kabra et al. |

(Continued)

FOREIGN PATENT DOCUMENTS

| | | | |
|---|---|---|---|
| WO | WO 2021/243340 | A1 | 12/2021 |

OTHER PUBLICATIONS

EPO Extended European Search Report dated Jul. 2, 2024, issued in corresponding European Patent Application No. 24176317.6, 8 pages.

(Continued)

*Primary Examiner* — Reginald G Bragdon
*Assistant Examiner* — Zakaria Mohammed Belkhayat
(74) *Attorney, Agent, or Firm* — Womble Bond Dickinson (US) LLP

(57) ABSTRACT

Provided is a method for data storage, the method including receiving a first request at a storage device, the first request being associated with a first protocol that is a memory protocol, converting address information associated with the first request to logical block address (LBA) information, determining, by the storage device, a first group of contiguous physical block addresses associated with the first request and associated with a first application, based on a data placement configuration of the storage device, and performing a first memory operation at the first group, based on the first request.

20 Claims, 6 Drawing Sheets

(56) References Cited

U.S. PATENT DOCUMENTS

| | | | | |
|---|---|---|---|---|
| 2013/0055371 | A1 | 2/2013 | Kumano et al. | |
| 2014/0108723 | A1* | 4/2014 | Nowoczynski | G06F 16/172 711/113 |
| 2016/0188206 | A1* | 6/2016 | Sinclair | G06F 3/0659 711/103 |
| 2020/0349071 | A1* | 11/2020 | Byun | G06F 12/0246 |
| 2021/0056023 | A1* | 2/2021 | Jin | G06F 3/0679 |
| 2021/0165737 | A1 | 6/2021 | Frolikov | |
| 2022/0107754 | A1 | 4/2022 | Li | |
| 2022/0114030 | A1 | 4/2022 | Johnson et al. | |
| 2022/0197833 | A1* | 6/2022 | Steinmetz | G06F 13/1668 |
| 2022/0253227 | A1 | 8/2022 | Helmick | |
| 2022/0382478 | A1 | 12/2022 | Park et al. | |
| 2024/0013819 | A1* | 1/2024 | Song | G06F 12/0284 |
| 2024/0264957 | A1* | 8/2024 | Jung | G06F 12/0246 |

OTHER PUBLICATIONS

Allison, Mike, et al., Flexible Data Placement from the NVM Express® Perspective, OCP Global Summit 2022, 18 pages.

Allison, Mike, et al., Flexible Data Placement using NVM Express® Implementation Perspective, OCP Global Summit 2022, 13 pages.

Sabol, Chris, et al., Hyperscale Innovation: Flexible Data Placement Mode (FDP), NVM Express, 12 pages.

* cited by examiner

500A

RSVD → F13

| F → | F1 | F2 | F3 | F4 | F5 | F6 | F7 | F8 | F9 | F10 | F11 | F12 | F13 | F14 | Total |
|---|---|---|---|---|---|---|---|---|---|---|---|---|---|---|---|
| W → (bits) | 1 | 4 | 3 | 2 | 2 | 16 | 46 | 1 | 1 | 4 | 0 | 0 | 22 | 2 | 104 |

FIG. 5A

500B

FDP Field → F15

| F → | F1 | F2 | F3 | F4 | F5 | F6 | F7 | F8 | F9 | F10 | F11 | F12 | F13 | F14 | F15 | Total |
|---|---|---|---|---|---|---|---|---|---|---|---|---|---|---|---|---|
| W → (bits) | 1 | 4 | 3 | 2 | 2 | 16 | 46 | 1 | 1 | 4 | 0 | 0 | 22 | 2 | X | 104+ X |

FIG. 5B

SYSTEMS AND METHODS FOR CONVERTING ADDRESS INFORMATION FOR DATA MANAGEMENT IN STORAGE DEVICES

CROSS-REFERENCE TO RELATED APPLICATION(S)

This application claims priority to, and benefit of, U.S. Provisional Application Ser. No. 63/471,413, filed on Jun. 6, 2023, entitled "MECHANISM TO SUPPORT FLEXIBLE DATA PLACEMENT FUNCTIONALITY IN CXL SSD," the entire content of which is incorporated herein by reference.

FIELD

Aspects of some embodiments according to the present disclosure relate to systems and methods for data management in storage devices using a data placement manager.

BACKGROUND

In the field of computer storage, a system may include a host and one or more storage devices connected to (e.g., communicably coupled to) the host. Such computer storage systems have become increasingly popular, in part, for allowing many different users to share the computing resources of the system. Storage requirements have increased over time as the number of users of such systems and the number and complexity of applications running on such systems have increased.

The above information disclosed in this Background section is for enhancement of understanding of the background of the present disclosure, and therefore, it may contain information that does not constitute prior art.

SUMMARY

One or more embodiments of the present disclosure are directed to computer storage systems, and may provide improvements to data placement in storage devices.

According to some embodiments of the present disclosure, there is provided a method for data storage, the method including receiving a first request at a storage device, the first request being associated with a first protocol that is a memory protocol, converting address information associated with the first request to logical block address (LBA) information, determining, by the storage device, a first group of contiguous physical block addresses associated with the first request and associated with a first application, based on a data placement configuration of the storage device, and performing a first memory operation at the first group, based on the first request.

The determining may include checking a field of the first request, checking a bit of the first request, or checking a configuration of the storage device.

The first group may be associated with a first area, and the storage device may include a second group associated with a second area of contiguous physical block addresses that are separated from the first group and associated with a second application.

The method may further include receiving a configuration request at the storage device, and dividing physical block addresses of the storage device into one or more groups of contiguous physical block addresses, the one or more groups including the first group.

The method may further include performing the first memory operation based on the LBA information, and receiving a second request associated with a second protocol that is different from the first protocol at the storage device, the second request including information identifying a second group of contiguous physical block addresses associated with the second request and associated with a second application.

The first protocol may be a cache-coherent protocol, and the second protocol may be a storage protocol.

The storage device may be configured to track grouping parameters associated with the data placement configuration, receive requests in accordance with the first protocol and in accordance with a second protocol that is different from the first protocol, and receive configuration requests for dividing the storage device in accordance with the data placement configuration.

According to some other embodiments of the present disclosure, there is provided a storage device including a non-volatile memory and being configured to receive a first request associated with a first protocol that is a memory protocol, convert address information associated with the first request to logical block address (LBA) information, determine a first group of contiguous physical block addresses associated with the first request and associated with a first application, based on a data placement configuration, and perform a first memory operation at the first group, based on the first request.

The determining may include checking a field of the first request, checking a bit of the first request, or checking a configuration of the storage device.

The first group may be associated with a first area, and the storage device may include a second group associated with a second area of contiguous physical block addresses that are separated from the first group and associated with a second application.

The storage device may be configured to receive a configuration request at the storage device, and divide physical block addresses of the storage device into one or more groups of contiguous physical block addresses, the one or more groups including the first group.

The storage device may be configured to perform the first memory operation based on the LBA information, and receive a second request associated with a second protocol that is different from the first protocol at the storage device, the second request including information identifying a second group of contiguous physical block addresses associated with the second request and associated with a second application.

The first protocol may be a cache-coherent protocol, and the second protocol may be a storage protocol.

The storage device may be configured to track grouping parameters associated with the data placement configuration, receive requests in accordance with the first protocol and in accordance with a second protocol that is different from the first protocol, and receive configuration requests for dividing the storage device in accordance with the data placement configuration.

According to some other embodiments of the present disclosure, there is provided a system for data storage, the system including a processor, and memory storing instructions, which, based on being executed by the processor, cause the processor to perform receiving a first request, the first request being associated with a first protocol that is a memory protocol, converting address information associated with the first request to logical block address (LBA) information, determining a first group of contiguous physical block addresses associated with the first request and associated with a first application, based on a data placement configuration of a storage device, and performing a first memory operation at the first group, based on the first request.

The determining may include checking a field of the first request, checking a bit of the first request, or checking a configuration of the storage device.

The first group may be associated with a first area, and the storage device may include a second group associated with a second area of contiguous physical block addresses that are separated from the first group and associated with a second application.

The instructions, based on being executed by the processor, may cause the processor to perform receiving a configuration request at the storage device, and dividing physical block addresses of the storage device into one or more groups of contiguous physical block addresses, the one or more groups including the first group.

The instructions, based on being executed by the processor, may cause the processor to perform the first memory operation based on the LBA information, and receiving a second request associated with a second protocol that is different from the first protocol at the storage device, the second request including information identifying a second group of contiguous physical block addresses associated with the second request and associated with a second application.

The first protocol may be a cache-coherent protocol, and the second protocol may be a storage protocol.

BRIEF DESCRIPTION OF THE DRAWINGS

The above and other aspects and features of the present disclosure will be more clearly understood from the following detailed description of the illustrative, non-limiting embodiments with reference to the accompanying drawings.

FIG. 5A is a diagram depicting fields of a first type of memory command, according to some embodiments of the present disclosure.

FIG. 5B is a diagram depicting fields of a second type of memory command, according to some embodiments of the present disclosure.

DETAILED DESCRIPTION

Figure 1:
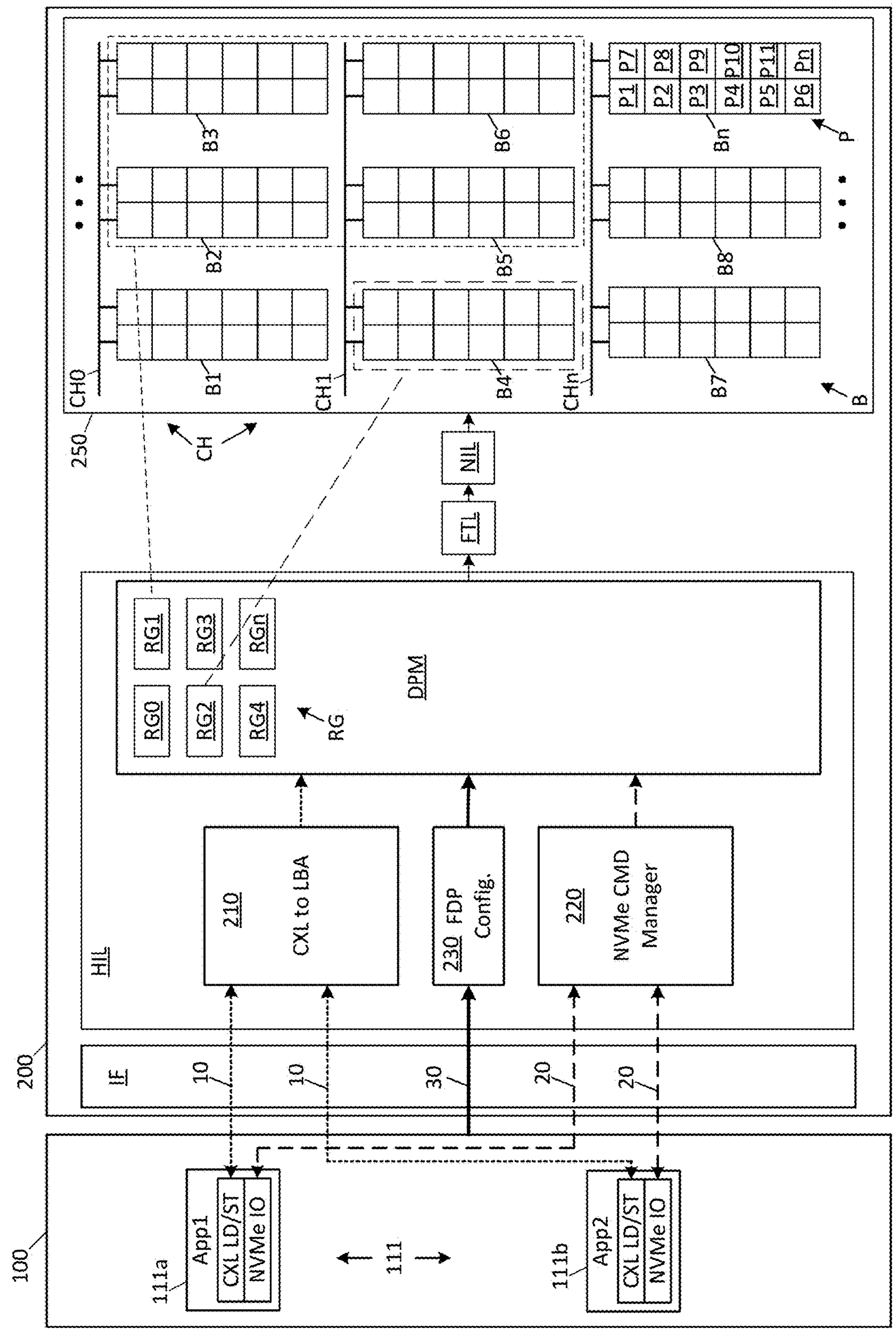
FIG. 1 is a system diagram depicting a system for data management in a storage device using a data placement manager, according to some embodiments of the present disclosure.

Aspects of the present disclosure and methods of accomplishing the same may be understood more readily by reference to the detailed description of one or more embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey aspects of the present disclosure to those skilled in the art. Accordingly, description of processes, elements, and techniques that are not necessary to those having ordinary skill in the art for a complete understanding of the aspects and features of the present disclosure may be omitted.

Unless otherwise noted, like reference numerals, characters, or combinations thereof denote like elements throughout the attached drawings and the written description, and thus, descriptions thereof will not be repeated. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown to facilitate a less obstructed view of these various embodiments and to make the description clear.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items. For example, the expression "A and/or B" denotes A, B, or A and B.

For the purposes of this disclosure, expressions such as "at least one of," when preceding a list of elements, modify the entire list of elements and do not modify the individual elements of the list. For example, "at least one of X, Y, or Z," "at least one of X, Y, and Z," and "at least one selected from the group consisting of X, Y, and Z" may be construed as X only, Y only, Z only, or any combination of two or more of X, Y, and Z, such as, for instance, XYZ, XYY, YZ, and ZZ.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Any of the components or any combination of the components described (e.g., in any system diagrams included herein) may be used to perform one or more of the operations of any flow chart included herein. Further, (i) the operations are merely examples, and may involve various additional operations not explicitly covered, and (ii) the temporal order of the operations may be varied.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory, which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Any of the functionalities described herein, including any of the functionalities that may be implemented with a host, a device, and/or the like or a combination thereof, may be implemented with hardware, software, firmware, or any combination thereof including, for example, hardware and/or software combinational logic, sequential logic, timers, counters, registers, state machines, volatile memories such as dynamic RAM (DRAM) and/or static RAM (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application-specific ICs (ASICs), central processing units (CPUs) including complex instruction set computer (CISC) processors and/or reduced instruction set computer (RISC) processors, graphics processing units (GPUs), neural processing units (NPUs), tensor processing units (TPUs), data processing units (DPUs), and/or the like, executing instructions stored in any type of memory. In some embodiments, one or more components may be implemented as a system-on-a-chip (SoC).

Any host disclosed herein that may implement any of the functionalities described herein relating to intermediary formats and/or languages may be implemented with any component or combination of components including one or more of a client device, a server, a storage node, a CPU, a personal computer, a tablet computer, a smartphone, and/or the like.

Any of the computational devices disclosed herein may be implemented in any form factor, such as 3.5 inch, 2.5 inch, 1.8 inch, M.2, Enterprise and Data Center Standard Form Factor (EDSFF), NF1, and/or the like, using any connector configuration such as Serial Advanced Technology Attachment (SATA), Small Computer System Interface (SCSI), Serial Attached SCSI (SAS), U.2, and/or the like. Any of the computational devices disclosed herein may be implemented entirely or partially with, and/or used in connection with, a server chassis, server rack, data room, data center, edge data center, mobile edge data center, and/or any combinations thereof.

Any of the devices disclosed herein that may be implemented as storage devices may be implemented with any type of nonvolatile storage media based on solid-state media, magnetic media, optical media, and/or the like. For example, in some embodiments, a storage device (e.g., a computational storage device) may be implemented as an SSD based on not-AND (NAND) flash memory, persistent memory such as cross-gridded nonvolatile memory, memory with bulk resistance change, PCM, and/or the like, or any combination thereof.

Any of the communication connections and/or communication interfaces disclosed herein may be implemented with one or more interconnects, one or more networks, a network of networks (e.g., the Internet), and/or the like, or a combination thereof, using any type of interface and/or protocol. Examples include Peripheral Component Interconnect Express (PCIe), non-volatile memory express (NVMe), NVMe-over-fabric (NVMe-oF), Ethernet, Transmission Control Protocol/Internet Protocol (TCP/IP), Direct Memory Access (DMA) Remote DMA (RDMA), RDMA over Converged Ethernet (ROCE), FibreChannel, InfiniBand, SATA, SCSI, SAS, Internet Wide Area RDMA Protocol (iWARP), and/or a coherent protocol, such as Compute Express Link (CXL), CXL.mem, CXL.cache, CXL.IO and/or the like, Gen-Z, Open Coherent Accelerator Processor Interface (OpenCAPI), Cache Coherent Interconnect for Accelerators (CCIX), and/or the like, Advanced extensible Interface (AXI), any generation of wireless network including 2G, 3G, 4G, 5G, 6G, and/or the like, any generation of Wi-Fi, Bluetooth, near-field communication (NFC), and/or the like, or any combination thereof.

In some embodiments, a software stack may include a communication layer that may implement one or more communication interfaces, protocols, and/or the like such as PCIe, NVMe, CXL, Ethernet, NVMe-oF, TCP/IP, and/or the like, to enable a host and/or an application running on the host to communicate with a computational device or a storage device.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

As mentioned above, in the field of computer storage, a system may include a host and one or more storage devices communicably coupled to the host. The storage devices may be configured to store data for applications running on the host. One or more of the storage devices may store the data in a storage and/or in a memory. For example, the storage may be associated with a non-volatile memory (e.g., a persistent memory) used to store one or more files. The files in the non-volatile memory may be available for use after a computer that stores the data is powered down and powered on again. In some embodiments of the present disclosure, the storage may be associated with a non-volatile memory (NVM) protocol (e.g., NVM express (NVMe)). Typically, the memory may be associated with a volatile memory used to store data temporarily for quicker access and quicker processing by the computer. The data in the memory may be unavailable after the computer is powered down. In some embodiments, the memory may be associated with a memory protocol (e.g., Compute Express Link (CXL)). In such embodiments, a CPU of a host may access persistent memory on one or more storage devices using the memory protocol, such that the NVM of the one or more storage devices may be used as memory.

Data centers with hyperscale workloads may experience write-amplification problems due to mixed data placement inside storage devices. Media reads and writes in a storage device having mixed data placement may affect the performance and quality of services (QOS) provided by the storage device. Flash media writes may cause non-host induced media wear. Flexible data placement (FDP) management methods include placing data from different applications together in isolated physical locations inside a storage device. "Flexible data placement," as used herein, refers to a type of data-placement scheme or configuration (e.g., a physical data-arrangement scheme), where data from different applications are stored in physical locations that are isolated from each other within a non-volatile memory of a storage device, such that data from one application can be erased from physical storage blocks associated with only the one application (i.e., without erasing data from physical storage blocks associated with other applications). FDP management methods can reduce write amplification because data associated with one application can be erased without erasing data associated with other applications.

Some storage systems may include applications that are configured to send requests (also referred to as "commands") to a storage device for different purposes (e.g., storage or memory) according to different protocols. Some protocols (e.g., storage protocols) may be compatible with FDP, and some protocols (e.g., memory protocols) may not be compatible (e.g., may not be conventionally compatible) with FDP. Various embodiments of the present disclosure provide architectures that may be used in the field of memory and/or computer storage to allow FDP to be used with a variety of memory protocols.

In some embodiments, the storage devices may include solid-state storage devices (SSDs), having non-volatile memory corresponding to one or more dies. Each die may include one or more blocks. Each block may include one or more pages. Each page may correspond to a logical block address (LBA) and a physical block address (PBA). Each LBA may identify a logical location of data associated with a namespace in the non-volatile memory. Each PBA may identify a physical location of the data associated with the namespace in the non-volatile memory. The namespace may be associated with a particular application. LBAs and PBAs may be used by the storage devices to locate and perform operations on the data in the non-volatile memory logically and physically. Two LBAs that are logically adjacent to each other may not be physically adjacent to each other. For example, contiguous PBAs may have mixed data associated with more than one application.

In some systems, data associated with a particular namespace (or application) may be grouped only by LBA, not by PBA. For example, two LBAs that are logically adjacent to each other may not be physically adjacent to each other. For example, contiguous PBAs may have mixed data associated with more than one application. In such systems a first application may have data stored in a first PBA, and a second application may have data stored in a second PBA that is contiguous with the first PBA within a same block of the non-volatile memory. The non-volatile memory in such systems may include one or more blocks with LBAs associated with different applications. In such systems, erasing data associated with one application may involve the storage device erasing each LBA associated with the one application along with the data associated with other applications within the same block. The performance of such systems may be degraded due to write amplification. Write amplification may wear down the non-volatile storage media (e.g., flash media) and waste power consumed in performing additional reads and writes associated with erasing data (e.g., associated with garbage collection).

In some embodiments of the present disclosure, a storage device may be configured for FDP, wherein data associated with a first application may be stored in PBAs that are not mixed in the same block as the data of other applications. In such embodiments, write amplification may be reduced, when compared to systems with mixed blocks (e.g., with mixed data placement inside the storage device as discussed above), by aligning logical block usage with physical storage media.

In some embodiments, the system may include applications that are configured to send requests (also referred to as "commands") to a storage device for different purposes (e.g., storage or memory) according to different protocols. Some protocols (e.g., storage protocols) may be compatible with FDP, and some protocols (e.g., memory protocols) may not be compatible (e.g., may not be conventionally compatible) with FDP. For example, some protocols (e.g., memory protocols) may involve additional processing steps, compared to other protocols (e.g., storage protocols), to become compatible with FDP. For example, NVMe is a protocol (e.g., a storage protocol) that is compatible with FDP. NVMe is a storage protocol that can use commands that include LBA information and FDP information for implementing and FDP scheme (e.g., an FDP configuration) in a storage device. On the other hand, memory protocols (e.g., CXL memory protocols), which may be cache-coherent protocols, may not be conventionally compatible with FDP. For example, CXL memory protocols do not conventionally use commands that include LBA information and FDP information. As such, in some embodiments, CXL memory address information that is used for cache coherency purposes between the CXL storage devices and one or more CPUs may first be converted to LBA information for a given CXL storage device. Accordingly, various embodiments of the present disclosure may provide architectures that may be used in the field of memory and/or computer storage to allow FDP to be used with a variety of memory protocols.

Currently, FDP is an optional capability of a non-volatile memory (NVM) command set for NVME storage protocols. NVM controllers may support log pages, which indicate the status of FDP, statistics about the FDP operation, and information that a host may use to detect and correct usage patterns that increase write amplification. In FDP, physical media may be grouped based on domains, endurance groups (EGs), and reclaim groups (RGs) to manage and monitor the wear experienced by different areas of physical storage media. A domain may include one or more EGs, each EG may include one or more RGs. As discussed below with reference to FIG. 4, RGs may include one or more reclaim units (RUs), with each RU being associated with a specific reclaim unit handle (RUH). If an NVM subsystem supports EGs, the scope of FDP capability may be each EG. If the NVM subsystem does not support EGs and supports only one domain, the scope of FDP capability may be the domain. FDP may not be supported if an NVM subsystem does not support EGs and supports more than one domain. A host may enable or disable FDP mode by issuing a Set Features command, which specifies the FDP mode feature and the FDP configuration to be applied to a specified EG. The host may delete all namespaces associated with the specified EG before changing a value of the FDP mode feature to enable FDP mode. If any namespace exists in the specified EG when a Set Features command that changes the value of the FDP mode feature is processed, a storage device controller may abort the command and indicate a Command Sequence Error status code. If a Set Features command that changes the value of the FDP mode feature is processed, then all events in an FDP events log page may be cleared, and each field in an FDP statistics log page may be cleared (e.g., cleared or set to zero or cleared or set to 0h). Once FDP mode is enabled, the non-volatile storage capacity for the specified EG, which may be referred to as "FDP storage," may be logically divided, as discussed below with respect to FIGS. 1 and 4. For example, FDP storage may include a set of one or more reclaim groups RG. Each reclaim group RG may include a set of reclaim units RU and a set of reclaim unit handles RUH. Within FDP storage, the number of reclaim unit handles RUH in each reclaim group RG may be the same.

Some storage devices may be capable of working with a variety of protocols. For example, a dual-mode storage device (e.g., a CXL dual-mode SSD) may be designed to work with CXL and NVMe. However, in dual-mode CXL SSD devices, a memory write command (e.g., CXL.mem) may not be capable of maintaining the FDP characteristics of the CXL SSD. Aspects of some embodiments of the present disclosure, provide a storage device architecture to support FDP in dual-mode storage devices.

FIG. 1 is a system diagram depicting a system for data management in a storage device using a data placement manager, according to some embodiments of the present disclosure.

Referring to FIG. 1, the system 1 may include a host 100 and a storage device (e.g., a dual-mode storage device) 200. In some embodiments, the storage device 200 may be an SSD. In some embodiments, the storage device 200 may be a dual-mode storage device (e.g., a dual-mode SSD that is compatible with a suitable cache coherent protocol, such as CXL), in which the storage device 200 may support a storage path (e.g., a path associated with an NVME mode) and a memory path (e.g., a path associated with a CXL.mem mode). The host 100 may include one or more applications 111. For example, a first application 111*a* and a second application 111*b* may run on the host, by way of computing resources (e.g., processing resources and memory resources) of the host. In some embodiments, the applications 111 may be virtual machines (VMs). The applications 111 may send requests and data to the storage device 200 using one or more protocols (e.g., NVME or CXL). For example, the first application 111*a* and the second application 111*b* may send requests to a storage device interface IF. In some embodiments, the storage device interface IF may be a CXL interface. A first interface 10 (e.g., a first channel) associated with the storage device interface IF may be capable of providing communications to and from the applications 111 in accordance with a first protocol (e.g., a memory protocol). The first protocol may be a memory protocol (e.g., a cache-coherent memory protocol), such as CXL. For example, the applications 111 may send memory requests (e.g., cache-coherent memory requests), such as CXL.mem load/store requests, via the first interface 10.

A second interface 20 (e.g., a second channel) associated with the storage device interface IF may be capable of providing communications to and from the applications 111 in accordance with a second protocol (e.g., a storage protocol). The second protocol may be a storage protocol that uses commands including LBA information and FDP information for the storage device 200. For example, the second protocol may be an NVMe protocol. The applications 111 may send NVMe input/output (I/O) commands via the second interface 20.

A third interface 30 (e.g., a third channel) associated with the storage device interface IF may be capable of receiving communications from the host 100 to process FDP configuration requests. In some embodiments, the storage device 200 may be dynamically configured using an NVMe mode and/or a CXL memory load/store (LD/ST) mode. For example, in some embodiments, the storage device 200 may provide an NVMe mode that is capable of performing reads and writes with block I/O granularities of 512B (bytes)

and/or 4 KB (kilobytes). In some embodiments, the storage device 200 may provide a CXL memory mode that is capable of performing memory reads and memory writes (e.g., memory load operations or memory store operations) to data with CXL.mem requests using load/store instructions for a byte-addressable 64B cacheline.

In some embodiments, the first interface 10, the second interface 20, and the third interface 30 may be associated with a host interface layer HIL of the storage device 200. The host interface layer HIL may include a variety of components for processing requests from different protocols.

For example, the first interface 10 may be coupled to a conversion component 210 of the host interface layer HIL. The conversion component 210 may handle memory requests that comply with a memory protocol (e.g., a cache-coherent memory protocol), such as CXL. The conversion component 210 may convert address information (e.g., cache-coherent address information) that is associated with maintaining cache coherency across a network of storage devices to local address information (e.g., LBA information) for the storage device 200. For example, the conversion component 210 may convert CXL information associated with the network of storage devices to LBA information for accessing a non-volatile memory 250 of the storage device 200. The storage device 200 may be one storage device of more than one storage devices coupled together (e.g., a storage device pool) by way of the storage device interface IF.

The second interface 20 may be coupled to a command manager 220 of the host interface layer HIL. The command manager 220 may handle data access requests associated with a storage protocol that is capable of providing FDP and LBA information. For example, the command manager 220 may be an NVMe command manager that handles NVMe I/O requests.

The third interface 30 may be coupled to an FDP configuration component 230 of the host interface layer HIL. The FDP configuration component 230 may handle configuration requests from the host 100 to configure the storage device 200 for a desired FDP scheme. In some embodiments, the FDP configuration component 230 may handle configuration requests associated with a memory protocol (e.g., CXL.io configuration requests). In some embodiments, the FDP configuration component 230 may handle configuration requests associated with a protocol that uses commands including LBA information for the storage device 200. For example, the FDP configuration component 230 may handle NVMe administration commands. In some embodiments, the third interface 30 may handle configuration requests associated with both a memory protocol and a protocol that uses commands including LBA information for the storage device 200.

Figure 4:
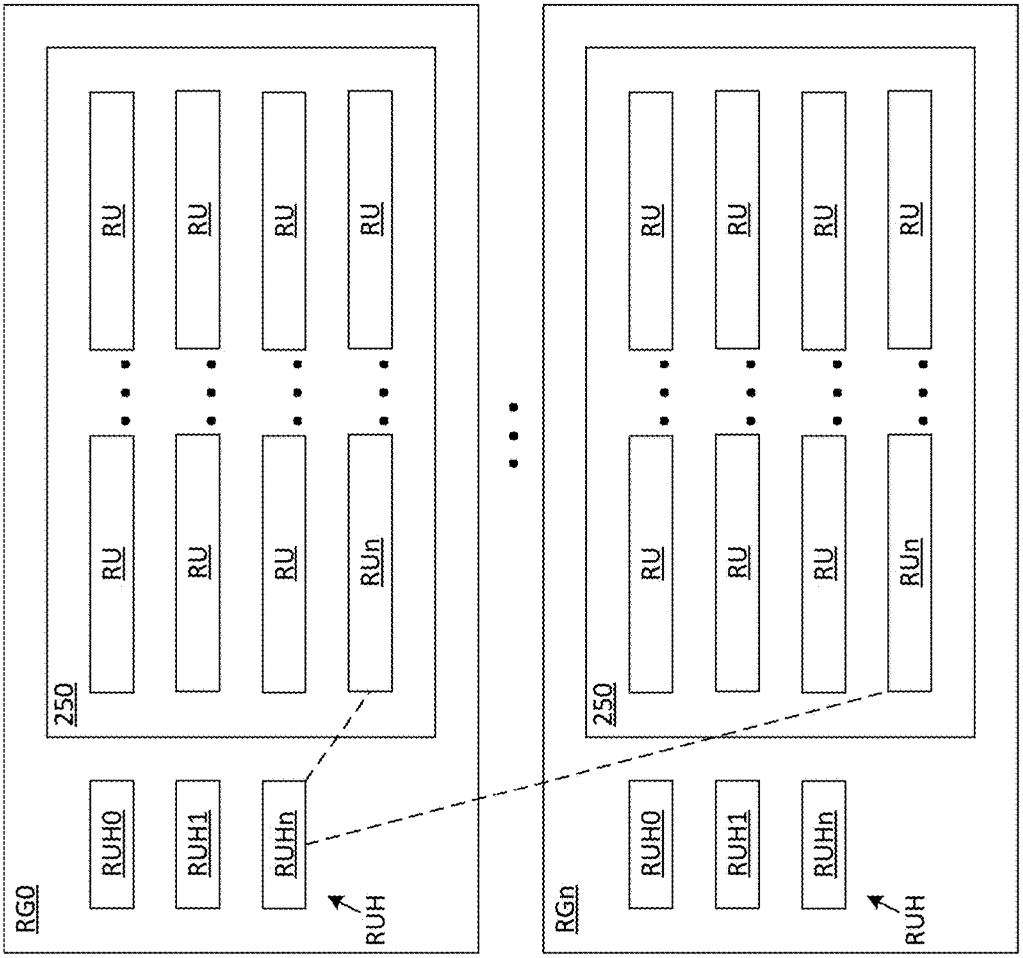
FIG. 4 is a diagram depicting components of reclaim groups associated with the system of FIG. 1, according to some embodiments of the present disclosure.

A data placement manager DPM (also referred to as an “FDP manager”) of the host interface layer HIL may process the respective outputs from the conversion component 210, the command manager 220, and the FDP configuration component 230. The data placement manager DPM may track global data placement information associated with the non-volatile memory 250 of the storage device 200. The data placement manager DPM may process configuration requests and data access requests and maintain the FDP characteristics of the non-volatile memory 250 based on the desired FDP parameters. The FDP parameters may include parameters for grouping areas of the non-volatile memory in accordance with a given or desired FDP scheme. For example, the FDP parameters may include reclaim groups RG (e.g., a zeroth reclaim group RG0 through an n-th reclaim group RGn, which are depicted in FIGS. 1 and 4, where n is a natural number greater than 1). Each reclaim group RG may be associated with one or more different physical areas in the non-volatile memory 250.

For example, the non-volatile memory 250 may include one or more channels CH (for example, a zeroth channel CH0 through an n-th channel CHn). Each channel CH may correspond to one or more dies. Each channel CH may include one or more blocks B. For example, as depicted in FIG. 1, the zeroth channel CH0 may include a first block B1, a second block B2, and a third block B3. A first channel CH1 may include a fourth block B4, a fifth block B5, and a sixth block B6. An n-th channel CHn may include a seventh block B7, an eighth block B8, and an n-th block Bn. Each block B may include one or more pages P (e.g., a first page P1 through an n-th page Pn, as depicted in the n-th block Bn in FIG. 1).

As depicted in FIG. 1, a first reclaim group RG1 may be associated, by way of an FDP scheme, with the second block B2, the third block B3, the fifth block B5, and the sixth block B6. The first reclaim group RG1 may be associated with the first application 111*a*. A second reclaim group RG2 may be associated, by way of the FDP scheme, with the fourth block B4. The second reclaim group RG2 may be associated with the second application 111*b*. Because the data associated with first application 111*a* is not mixed with the data associated with the second application 111*b* inside of any of the blocks B, data associated with the first application 111*a* may be erased without erasing any of the data associated with the second application 111*b*, and vice-versa. Such an arrangement may allow for a reduction in write amplification and a reduction in latency.

As discussed above, the data placement manager DPM may track global information and maintain the FDP characteristics of the non-volatile memory 250 based on the desired FDP parameters. The data placement manager DPM may be coupled to a flash translation layer FTL and a non-volatile memory interface layer NIL to manage data access at the non-volatile memory 250.

In some embodiments, FDP may be supported in a memory path (e.g., a cache-coherent memory path), such as a CXL.mem path, of a dual-mode storage device (e.g., a dual-mode CXL SSD) by allowing the host 100 to configure the storage device 200 with FDP parameters during an FDP namespace generation operation. The FDP parameters may include reclaim groups RG, reclaim units RU, reclaim unit handles RUH, FDP attributes, and placement identifiers (PIDL) (e.g., default or desired placement identifiers) (reclaim groups RG, reclaim units RU, and reclaim unit handles RUH are depicted in FIG. 4). The FDP parameters allow for write locations to be fixed in advance according to the FDP scheme. In some embodiments, the host 100 may configure the storage device 200 by providing the FDP parameters through a memory protocol manager, such as a fabric manager (FM) unit over CXL.io.

According to one or more embodiments, the memory path (e.g., the CXL.mem path) may support FDP in three ways: per address (e.g., per CXL.mem address), based on address range, and based on a default PIDL. Using the per address method, a memory command (e.g., a CXL LD/ST command) may include a field with bits indicating FDP information. For example, a first type of memory command 500A (e.g., a memwr command or a memwrptl command) (see FIG. 5A) may include unused bits (e.g., 22 unused bits) in a reserved (RSVD) bit field F13. One or more applications 111 may send requests to the storage device 200, using some of the unused bits of the RSVD bit field F13 to provide the storage device 200 with a PIDL for FDP. In some embodiments, a second type of memory command 500B (see FIG. 5B) may include an FDP directive field F15, having X bits, wherein X is a positive integer. For example, the CXL standard may be modified to include a field for CXL memory commands. One or more applications 111 may send requests to the storage device 200, using bits of the FDP directive field F15 to provide the storage device 200 with a desired PIDL for FDP.

Using the address range method, PIDLs for FDP configuration may be predefined based on address ranges. For example, the host 100 may configure an FDP configuration space using a memory protocol manager (e.g., a FM over a CXL I/O path) and may predefine PIDLs for different address spaces during an FDP namespace generation operation.

Using the default PIDL method, memory requests (e.g., CXL requests) may be handled by the storage device 200 using a default PIDL configured during an FDP namespace generation operation.

FDP may be supported in accordance with a protocol that uses commands comprising LBA information for the storage device 200 (e.g., an NVMe protocol) by way of a directive method and/or by way of a non-directive method. Using the directive method, data may be placed in reclaim groups RG and reclaim units RU according to a PIDL. The PIDL may be provided in a directive field of a write command (e.g., an NVMe I/O command). Using the non-directive method, data may be placed in reclaim groups RG and reclaim units RU according to a default PIDL. For example, the default PIDL may be configured during an FDP namespace generation operation via an administration command (e.g., an NVMe administration command).

Accordingly, a dual-mode storage device may be provided, wherein FDP may be fully implemented with the memory path (e.g., the CXL.mem path) and an NVMe data path managed by a conventional controller (e.g., a conventional NVMe controller). Implementing FDP with the memory path (e.g., the CXL.mem path) may reduce a latency of the memory path. Furthermore, write amplification and overprovisioning may be reduced.

Figure 2:
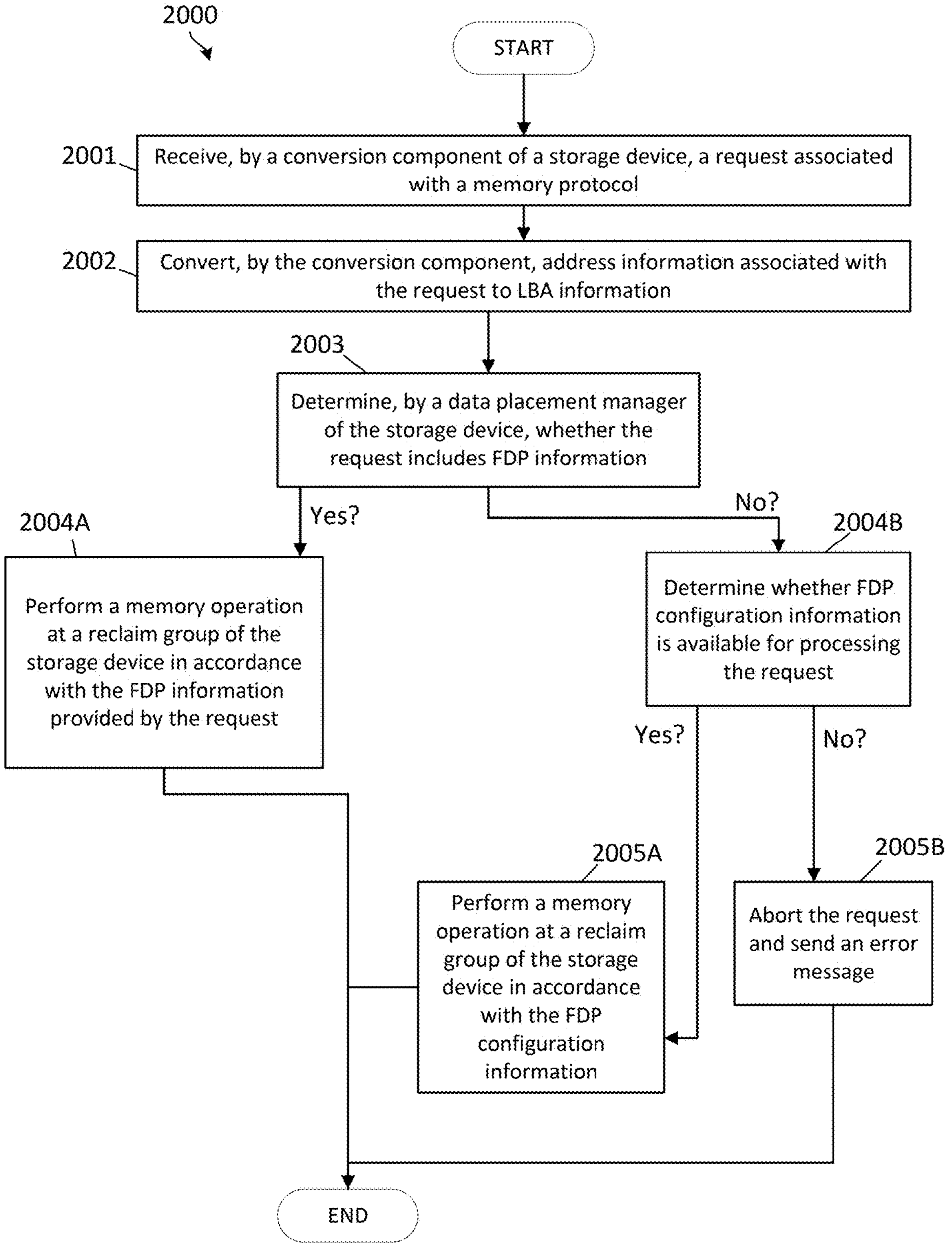
FIG. 2 is a flowchart depicting example operations of a method for data management in a storage device using a data placement manager to process requests associated with a memory protocol, according to some embodiments of the present disclosure.

FIG. 2 is a flowchart depicting example operations of a method for data management in a storage device using a data placement manager to process requests associated with a memory protocol, according to some embodiments of the present disclosure.

Figure 3:
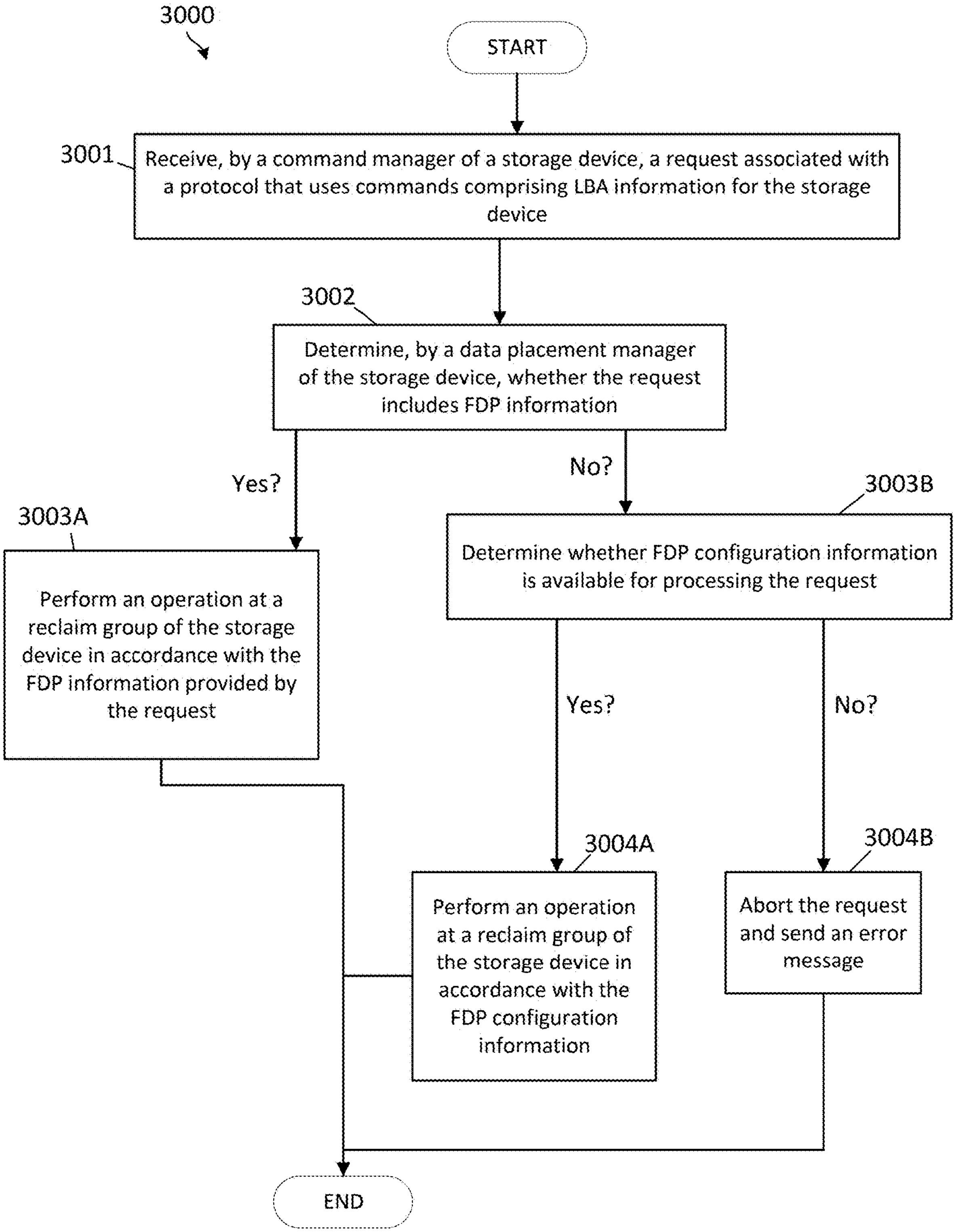
FIG. 3 is a flowchart depicting example operations of a method for data management in a storage device using a data placement manager to process requests associated with a protocol using commands comprising LBA information for the storage device, according to some embodiments of the present disclosure.

FIG. 3 is a flowchart depicting example operations of a method for data management in a storage device using a data placement manager to process requests associated with a protocol using commands comprising LBA information for the storage device, according to some embodiments of the present disclosure.

Referring to FIG. 2, a method 2000 for data storage using a data placement manager DPM may include one or more of the following operations. The storage device 200 may receive a request (e.g., a memory write request) at a conversion component 210 (operation 2001). The conversion component 210 may be coupled to a first interface associated with a memory protocol (operation 2001). The conversion component 210 may convert memory address information (e.g., cache-coherent memory address information) associated with the request to LBA information (operation 2002). A data placement manager DPM may receive the LBA information from the conversion component 210 and may determine whether the request includes FDP information associated an FDP configuration (operation 2003). If the request includes FDP information associated with an FDP scheme (e.g., by way of RSVD bits or an FDP field), the data placement manager DPM may process the LBA information for performing a memory operation (e.g., a load operation or a memory write operation) at a reclaim group RG of the non-volatile memory 250 in accordance with the FDP information provided by the request (operation 2004). If the write request does not include FDP information, the data placement manager DPM may determine whether FDP configuration information (e.g., associated with an FDP namespace generation operation) is provided to the data placement manager DPM for processing the request (operation 2004B). If FDP configuration information is provided, the data placement manager DPM may process the LBA information for performing a memory operation (e.g., a load operation or a memory write operation) at a reclaim group RG of the non-volatile memory 250 in accordance with the FDP configuration information (2005A). If FDP configuration information is not provided, the data placement manager DPM may abort the request and may send an error message to the host 100 (2005B).

Referring to FIG. 3, a method 3000 for data storage using a data placement manager DPM may include one or more of the following operations. The storage device 200 may receive a write request (e.g., an NVMe write request) at a command manager 220 (operation 3001). The command manager 220 may be coupled to a second interface associated with a protocol that uses commands including LBA information for the storage device 200 (e.g., without the storage device 200 performing a conversion operation) (operation 3001). A data placement manager DPM may receive the FDP and LBA information from the command manager 220 and may determine whether the write request includes FDP information associated an FDP configuration (operation 3002). If the write request includes FDP information associated with an FDP scheme, the data placement manager DPM may process the LBA information for performing a write operation at a reclaim group RG of the non-volatile memory 250 in accordance with the FDP information provided by the write request (operation 3003A). If the write request does not include FDP information, the data placement manager DPM may determine whether FDP configuration information (e.g., associated with an FDP namespace generation operation) is provided to the data placement manager DPM for processing the write request (operation 3003B). If FDP configuration information is provided, the data placement manager DPM may process the LBA information for performing a write operation at a reclaim group RG of the non-volatile memory 250 in accordance with the FDP configuration information (3004A). If FDP configuration information is not provided, the data placement manager DPM may abort the write request and may send an error message to the host 100 (3004B).

FIG. 4 is a diagram depicting components of reclaim groups associated with the system of FIG. 1, according to some embodiments of the present disclosure.

Referring to FIG. 4, and as discussed above, the FDP parameters may include parameters for grouping areas of the non-volatile memory in accordance with a given or desired FDP scheme (e.g., a given or desired FDP configuration). For example, the FDP parameters may include reclaim groups RG (e.g., a zeroth reclaim group RG0 through an n-th reclaim group RGn). Each reclaim group RG may be associated with one or more different physical areas in the non-volatile memory 250. Each reclaim group RG may include one or more reclaim units RU. Each reclaim unit RU may correspond to a given reclaim unit handle RUH. Each reclaim unit handle RUH may provide access to respective reclaim units across reclaim groups RG. For example, an n-th reclaim unit handle RUHn may provide access to an n-th reclaim unit RUn in each reclaim group RG.

FIG. 5A is a diagram depicting fields of a first type of memory command, according to some embodiments of the present disclosure.

Referring to FIG. 5A, the first type of memory command 500A may include fields F having a variety of bit widths W. In some embodiments, the first type of memory command 500A may be a memory write request (e.g., an M2S RwD associated with 256-bit filtering in some configurations). For example, in some configurations, 256-bit filtering is one option according to the CXL 3.0 specification. As discussed above, the first type of memory command 500A may include unused bits (e.g., 22 unused bits) in the RSVD bit field F13. According to one or more embodiments of the present disclosure, the RSVD field may be used to provide FDP information for routing data associated with the first type of memory command 500A to the proper reclaim group RG and the proper reclaim unit RU. In some embodiments, the 22 unused bits may be sufficient to allow for data placement with respect to a maximum amount of reclaim groups RG.

In addition to the RSVD bit field F13, the first type of memory command 500A may include a valid field F1, a memo pcode field F2, an snptype field F3, a metafield F4, a metavalue field F5, a tag field F6, an address field F7, a pois on field F8, a BEP field F9, an LD-ID field F10, an SPID field F11, a DPID field F12, and a TC field F14. Each field may have a bit width W, as indicated in FIG. 5A. The first type of memory command 500A may include a total of 104 bits.

FIG. 5B is a diagram depicting fields of a second type of memory command, according to some embodiments of the present disclosure.

Referring to FIG. 5B, the second type of memory command 500B may include the fields F of the first type of memory command 500A plus an additional FDP field F15 having a bit width W of X bits (X being a positive integer greater than zero). In some embodiments, the second type of memory command 500B may be a write request (e.g., an M2S RwD associated with 256-bit filtering). The FDP field F15 may include FDP information for routing data associated with the second type of memory command 500B to the proper reclaim group RG and the proper reclaim unit RU. The second type of memory command 500B may include a total of 104 plus X bits.

Figure 6:
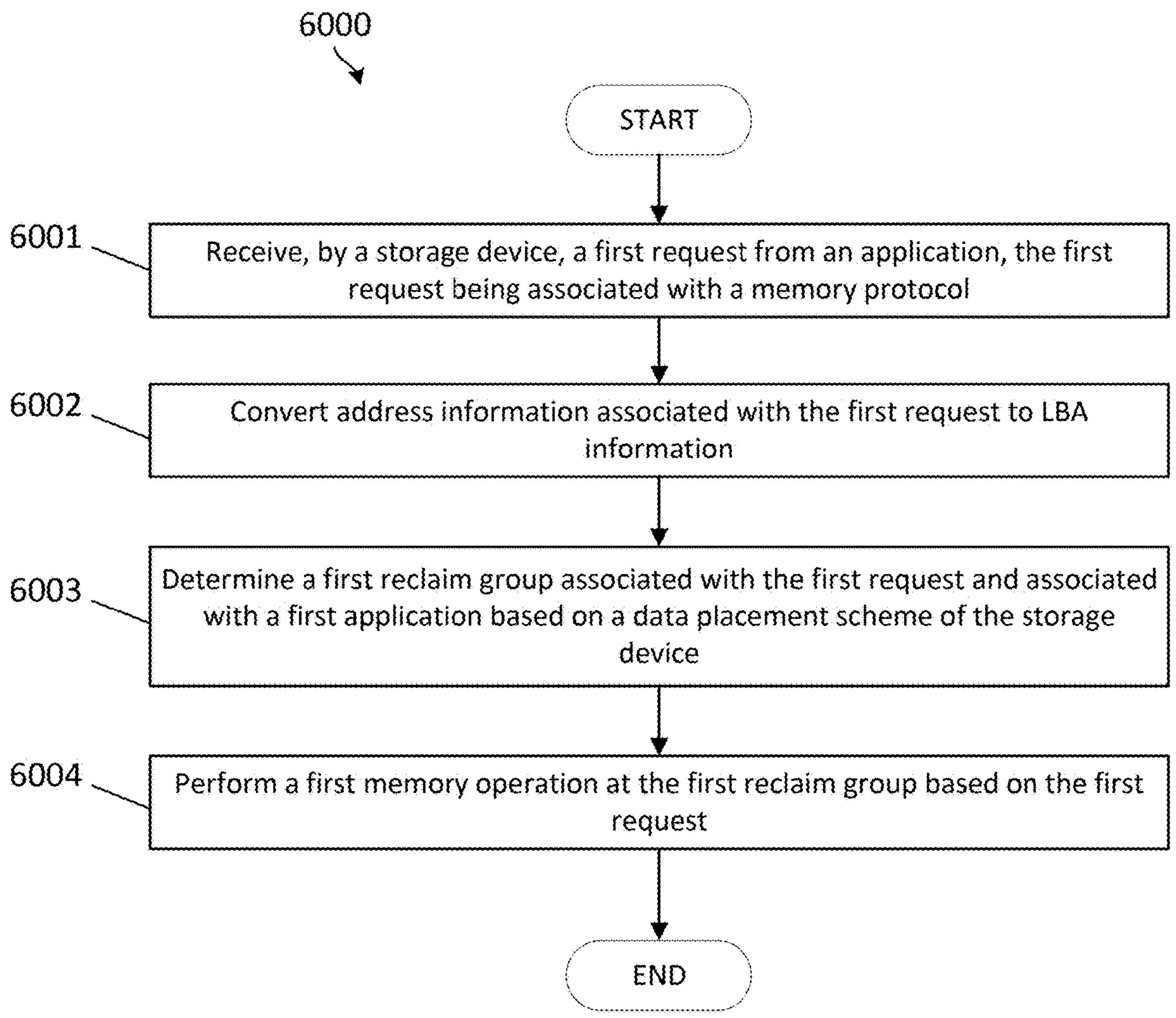
FIG. 6 is a flowchart depicting example operations of a method for data storage using data management in a storage device, according to some embodiments of the present disclosure.

FIG. 6 is a flowchart depicting example operations of a method for data storage using data management in a storage device, according to some embodiments of the present disclosure.

Referring to FIG. 6, the method 6000 may include the following example operations. A storage device 200 may receive a first request (e.g., a write request) from an application 111*a* running on a host 100 (operation 6001). The first request may be associated with a first protocol that is a memory protocol (e.g., CXL) (operation 6001). The storage device 200 may convert address information (e.g., cache-coherent memory address information) associated with the first request to LBA information (operation 6002). A data placement manager DPM of the storage device 200 may determine a first reclaim group RG associated with the first request and associated with a first application based on data placement configuration of the storage device 200 (operation 6003). The storage device 200 may perform a first operation (e.g., a first memory operation) at the first reclaim group RG based on the first request (operation 6004). For example, a portion of the storage device 200 that processes requests in accordance with the memory protocol (e.g., CXL) may receive a memory request. The storage device 200 may convert the memory request to a write command (e.g., a NAND write command). The write command may operate on the first reclaim group RG.

Accordingly, aspects of some embodiments of the present disclosure may provide improvements to computer storage by providing FDP for a variety of protocols to reduce write amplification and latencies associated with computer storage systems.

Example embodiments of the disclosure may extend to the following statements, without limitation:

Statement 1. An example method includes: receiving a first request at a storage device, the first request being associated with a first protocol that is a memory protocol, converting address information associated with the first request to logical block address (LBA) information, determining, by the storage device, a first group of contiguous physical block addresses associated with the first request and associated with a first application, based on a data placement configuration of the storage device, and performing a first memory operation at the first group, based on the first request.

Statement 2. An example method includes the method of statement 1, wherein the determining includes checking a field of the first request, checking a bit of the first request, or checking a configuration of the storage device.

Statement 3. An example method includes the method of any of statements 1 and 2, wherein the first group is associated with a first area, and the storage device includes a second group associated with a second area of contiguous physical block addresses that are separated from the first group and associated with a second application.

Statement 4. An example method includes the method of any of statements 2 and 3, and further includes receiving a configuration request at the storage device, and dividing physical block addresses of the storage device into one or more groups of contiguous physical block addresses, the one or more groups including the first group.

Statement 5. An example method includes the method of any of statements 2-4, and further includes performing the first memory operation based on the LBA information, and receiving a second request associated with a second protocol that is different from the first protocol at the storage device, the second request including information identifying a second group of contiguous physical block addresses associated with the second request and associated with a second application.

Statement 6. An example method includes the method of any of statements 2-5, wherein the first protocol is a cache-coherent protocol, and the second protocol is a storage protocol.

Statement 7. An example method includes the method of any of statements 2-6, wherein the storage device is configured to track grouping parameters associated with the data placement configuration, receive requests in accordance with the first protocol and in accordance with a second protocol that is different from the first protocol, and receive configuration requests for dividing the storage device in accordance with the data placement configuration.

Statement 8. An example device for performing the method of any of statements 1-7 includes a non-volatile memory.

Statement 9. An example system includes a processor, and memory storing instructions, which, based on being executed by the processor, cause the processor to perform the method of any of statements 1-7.

While embodiments of the present disclosure have been particularly shown and described with reference to the embodiments described herein, it will be understood by those of ordinary skill in the art that various changes in form and details may be made therein without departing from the spirit and scope of the present disclosure as set forth in the following claims and their equivalents.

What is claimed is:

1. A method for data storage, the method comprising:

receiving a first request at a first channel of a storage device, the first request being associated with a first protocol that is a memory protocol, the first channel connected to a conversion component of a host interface layer of the storage device;

converting, by the storage device, cache-coherent address information from the first request to logical block address (LBA) information to comply with a flexible data placement scheme, the flexible data placement scheme corresponding to storing data from a first application and data from a second application in separate contiguous physical locations;

determining, by the storage device, a first group of contiguous physical block addresses associated with the first request and associated with the first application, based on the flexible data placement scheme; and performing a first memory operation at the first group, based on the first request, wherein the storage device is configured to receive, at a second channel different from the first channel, configuration requests, from an external source, to divide a physical area of the storage device into different groups in accordance with the flexible data placement scheme, the second channel connected to a flexible-data-placement configuration component of the host interface layer, and wherein the host interface layer is configured to track global data placement information for the different groups and to manage data access to the storage device based on:

processing requests from the first channel and from the second channel; and determining whether requests from the first channel include flexible-data- placement information.

2. The method of claim 1, wherein the determining of the first group comprises checking a field of the first request, checking a bit of the first request, or checking a configuration of the storage device.

3. The method of claim 1, wherein:

the first group is associated with a first area; and the storage device comprises a second group associated with a second area of contiguous physical block addresses that are separated from the first group and associated with the second application.

4. The method of claim 1, further comprising:

receiving a configuration request at the storage device; and dividing physical block addresses of the storage device into one or more groups of contiguous physical block addresses, the one or more groups comprising the first group.

5. The method of claim 1, further comprising:

performing the first memory operation based on the LBA information; and receiving a second request associated with a second protocol that is different from the first protocol at the storage device, the second request including information identifying a second group of contiguous physical block addresses associated with the second request and associated with the second application.

6. The method of claim 5, wherein:

the first protocol is a cache-coherent protocol; and the second protocol is a storage protocol.

7. The method of claim 1, wherein the storage device is configured to:

track grouping parameters associated with the flexible data placement scheme; and receive requests in accordance with the first protocol and in accordance with a second protocol that is different from the first protocol.

8. The method of claim 1, further comprising deleting, by the storage device, the data from the first application; and maintaining the data from the second application.

9. A storage device, comprising a non-volatile memory and being configured to:

receive, at a first channel, a first request associated with a first protocol that is a memory protocol, the first channel connected to a conversion component of a host interface layer of the storage device;

convert cache-coherent address information from the first request to logical block address (LBA) information to comply with a flexible data placement scheme, the flexible data placement scheme corresponding to storing data from a first application and data from a second application in separate contiguous physical locations;

determine a first group of contiguous physical block addresses associated with the first request and associated with the first application, based on the flexible data placement scheme; and perform a first memory operation at the first group, based on the first request, wherein the storage device is configured to receive, at a second channel different from the first channel, configuration requests, from an external source, to divide a physical area of the storage device into different groups in accordance with the flexible data placement scheme, the second channel connected to a flexible-data-placement configuration component of the host interface layer, and wherein the host interface layer is configured to track global data placement information for the different groups and to manage data access to the storage device based on:

processing requests from the first channel and from the second channel; and determining whether requests from the first channel include flexible-data-placement information.

10. The storage device of claim 9, wherein the determining of the first group comprises checking a field of the first request, checking a bit of the first request, or checking a configuration of the storage device.

11. The storage device of claim 9, wherein:

the first group is associated with a first area; and the storage device comprises a second group associated with a second area of contiguous physical block addresses that are separated from the first group and associated with the second application.

12. The storage device of claim 9, configured to:

receive a configuration request at the storage device; and divide physical block addresses of the storage device into one or more groups of contiguous physical block addresses, the one or more groups comprising the first group.

13. The storage device of claim 9, configured to:
perform the first memory operation based on the LBA information; and
receive a second request associated with a second protocol that is different from the first protocol at the storage device, the second request including information identifying a second group of contiguous physical block addresses associated with the second request and associated with the second application.

14. The storage device of claim 13, wherein:
the first protocol is a cache-coherent protocol; and
the second protocol is a storage protocol.

15. The storage device of claim 9, configured to:
track grouping parameters associated with the flexible data placement scheme; and
receive requests in accordance with the first protocol and in accordance with a second protocol that is different from the first protocol.

16. A system for data storage, the system comprising:
a processor; and
memory storing instructions, which, based on being executed by the processor, cause the processor to perform:
receiving, at a first channel of a storage device, a first request, the first request being associated with a first protocol that is a memory protocol, the first channel connected to a conversion component of a host interface layer of the storage device;
converting cache-coherent address information from the first request to logical block address (LBA) information to comply with a flexible data placement scheme, the flexible data placement scheme corresponding to storing data from a first application and data from a second application in separate contiguous physical locations;
determining a first group of contiguous physical block addresses associated with the first request and associated with the first application, based on the flexible data placement scheme; and
performing a first memory operation at the first group, based on the first request,
wherein the system is configured to receive, at a second channel different from the first channel, configuration requests, from an external source, to divide a physical area of the system into different groups in accordance with the flexible data placement scheme, the second channel connected to a flexible-data-placement configuration component of the host interface layer, and
wherein the host interface layer is configured to track global data placement information for the different groups and to manage data access to the storage device based on:
processing requests from the first channel and from the second channel; and
determining whether requests from the first channel include flexible-data-placement information.

17. The system of claim 16, wherein the determining of the first group comprises checking a field of the first request, checking a bit of the first request, or checking a configuration of the storage device.

18. The system of claim 16, wherein:
the first group is associated with a first area of the storage device; and
the storage device comprises a second group associated with a second area of contiguous physical block addresses that are separated from the first group and associated with the second application.

19. The system of claim 16, wherein the instructions, based on being executed by the processor, cause the processor to perform:
receiving a configuration request; and
dividing physical block addresses of the storage device into one or more groups of contiguous physical block addresses, the one or more groups comprising the first group.

20. The system of claim 16, wherein the instructions, based on being executed by the processor, cause the processor to perform:
the first memory operation based on the LBA information; and
receiving a second request associated with a second protocol that is different from the first protocol, the second request including information identifying a second group of contiguous physical block addresses associated with the second request and associated with the second application.

* * * * *